(12) United States Patent
Wyles

(10) Patent No.: US 8,925,985 B2
(45) Date of Patent: Jan. 6, 2015

(54) GARDEN TOOL

(76) Inventor: Jeff Wyles, Powell River (CA)

( * ) Notice: Subject to any disclaimer, the term of this patent is extended or adjusted under 35 U.S.C. 154(b) by 0 days.

(21) Appl. No.: 14/237,467

(22) PCT Filed: Jun. 26, 2012

(86) PCT No.: PCT/CA2012/050424
§ 371 (c)(1),
(2), (4) Date: Feb. 6, 2014

(87) PCT Pub. No.: WO2014/000080
PCT Pub. Date: Jan. 3, 2014

(65) Prior Publication Data
US 2014/0183887 A1   Jul. 3, 2014

(51) Int. Cl.
*B66C 1/00* (2006.01)
*C03B 35/20* (2006.01)
*A01B 1/18* (2006.01)
*A01B 1/16* (2006.01)

(52) U.S. Cl.
CPC .... *A01B 1/18* (2013.01); *A01B 1/16* (2013.01)
USPC ......................................... 294/118; 294/50.8

(58) Field of Classification Search
USPC ........... 294/8.5, 11, 16, 50.6, 50, 8, 118, 902,
294/99.2, 50.8; 111/100, 101, 92, 112, 234;
172/378; 7/125, 127, 129, 139;
81/90.1, 454
See application file for complete search history.

(56) References Cited

U.S. PATENT DOCUMENTS

| | | | |
|---|---|---|---|
| 437,466 A | 9/1890 | Vogal | |
| 2,239,108 A | 4/1941 | Lindemann | |
| 4,274,619 A | 6/1981 | Redmond | |
| 6,536,819 B2 * | 3/2003 | Wang et al. | 294/16 |
| 6,966,269 B2 | 11/2005 | Sawatsky et al. | |
| D530,459 S * | 10/2006 | White | D30/162 |
| D555,309 S * | 11/2007 | Pontzious | D32/46 |
| 7,314,095 B2 * | 1/2008 | Cobb | 172/25 |
| 2003/0107226 A1 * | 6/2003 | Wang et al. | 294/16 |
| 2009/0066101 A1 * | 3/2009 | Cho | 294/99.2 |

FOREIGN PATENT DOCUMENTS

GB       2081170 A       2/1982

* cited by examiner

*Primary Examiner* — Stephen Vu

(57) ABSTRACT

A garden hand-weeding tool, which distributes, rather than concentrates, gripping forces in order to effectively grip and remove plants, including their roots, from the soil without crushing or severing them and without clogging the apparatus. The present invention generally comprises; pivotally connected specially contoured jaw and handle assemblies, a non-crushing gripping zone, and an opening for soil and debris to exit the gripping zone upon repetitive use. The jaws, biased to an open state, are positioned into the soil longitudinally about a weed and then closed via the operator's hand grip/force applied to the handles. The jaws when fully closed do not create a complete mating closure along their length thereby eliminating the chance of severing the weed or root. This allows the entire weed including roots to be easily removed from the soil. A jaw is self-cleaning with each new mouthful pushing the last out through the opening.

22 Claims, 6 Drawing Sheets

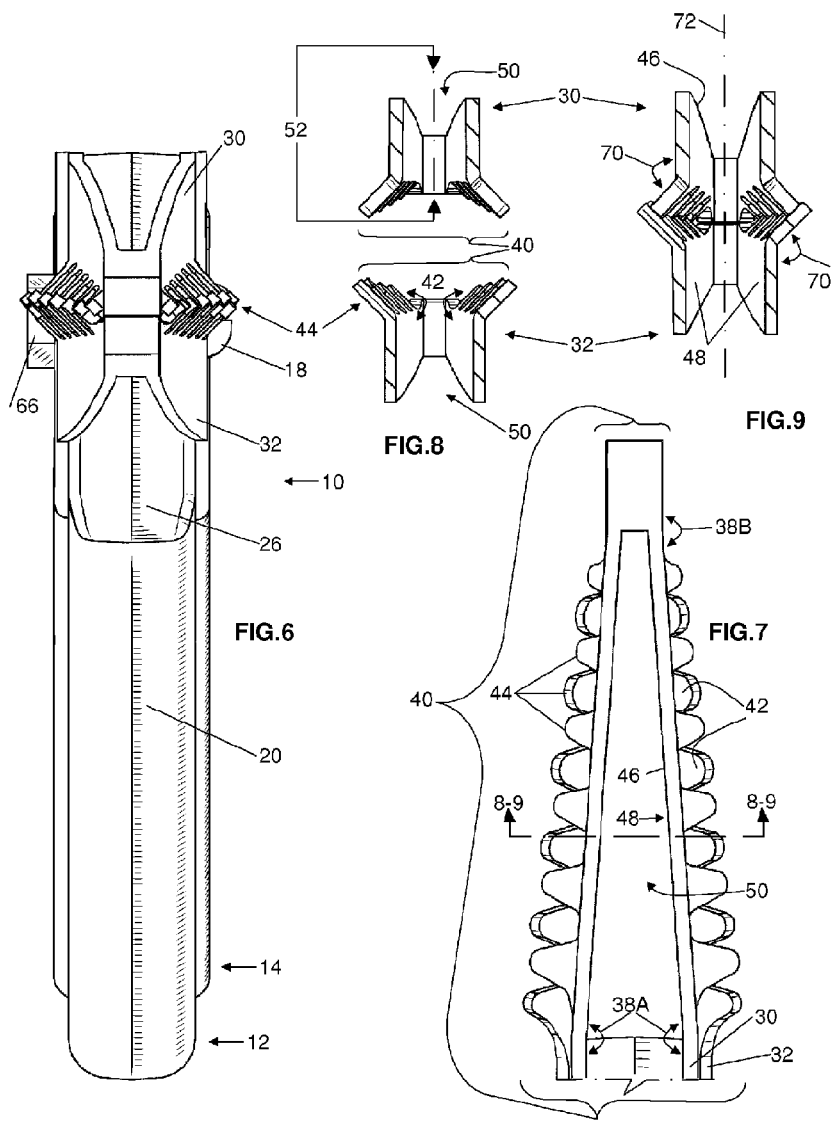

GARDEN TOOL

TECHNICAL FIELD

The present invention relates to garden tools and more specifically, to hand operable weeding tools.

BACKGROUND ART

Many types of weed control methods and tools have been developed for the garden industry. Several non-chemical manual weed control methods have been used, and most involve cultivation with sharp edged blades of some type fixed to handles. These blades are manipulated about the soil to disrupt weed growth, sever weed roots, and dislodge them from the soil. The blade type garden tool of U.S. Pat. No. 6,415,874 and others commonly known as cultivators, hoes, hand plows and Cape Cod Weeders for example, are only partially effective due to the fact that they sever weed roots off underground leaving roots that may then re-grow. Additionally many of the dislodged weeds will also re-grow in their new location if they are not subsequently picked up for disposal, thus adding to the inefficient work involved. Also, the sharp edged blades often nick and damage the roots of desirable plants growing nearby and therefore render these tools ineffective around the closely spaced plantings found in many gardens.

It is to be noted that the aforementioned and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Another type of weed control is individual weed removal. For example U.S. Pat. Nos. 1,061,175 and 5,375,401 and 5,535,833 show grip type weeding apparatuses utilizing a cutting blade and a pivotal claw arranged to close against the surface of the blade thus pinching the weed for removal. These types of tools tend to be somewhat useful for picking up weeds and debris but fail to be effective for pulling plant material from the ground due to their single point or narrow edge pinching mechanisms which apply their gripping pressure over a very small surface area. This tends to crush and tear or sever the plant material at a concentrated pinch area instead of holding it firm enough to be pulled out of the soil intact. Other designs for example U.S. Pat. Nos. 437,466 and 3,276,805 and 4,400,029 and D206,544 have incorporated cup or opposing channel sections that trap the weed but these also tend to crush and/or sever the majority of roots and or become clogged and need repeated cleaning.

U.S. Pat. Nos. 5,234,241 and 7,063,168 and 7,845,696 show various methods utilizing a plurality of spikes or blades coming together to trap the plant and root structure to be removed. Some of the above noted tools are effective in removal of larger weeds with tough tap roots, for example dandelions typical in lawns, but they are generally large cumbersome tools designed for use by a standing operator using both hands and sometimes feet as well. These tools are generally expensive to manufacture and do not address the issue of smaller weeds and grasses most common among typical vegetable or flower gardens where a smaller hand operated tool suitable for both tap root weeds and multi-rootlet type weeds would be better suited.

Attempts have been made to create a plier-based hand-weeding tool but these too have failed in several ways. For example in U.S. Pat. No. 2,239,108 the jaws come together at a relatively narrow peak along their length and again this dull knife-edge tends to concentrate forces, severing tender roots instead of gripping them for removal. U.S. Pat. No. 4,274,619 shows an improvement in gripping and leverage but does not address the vital root system as the above ground stem is the only portion of the plant grasped and often the stem snaps leaving the underground roots in place to grow again. U.S. Pat. No. 4,389,065 shows an improvement in gripping technology using rubber gripping pads but due to the blunt design necessitates first digging around the weed or plant to expose the root structure for gripping adding unnecessary work and in addition the handle structure is not user friendly.

Avid gardeners are all too well aware that complete removal including the roots of a weed plant is always the best option for preventing re-growth of the same weed. Often the most effective and quickest method of weed control for many gardeners is to resort to using their hands, or more specifically their fingers, to grip and remove individual weeds and roots and dispose of them entirely. In addition to this method being hard on ones hands, especially where spiny weeds are an issue, the main problem is that even strong fingered individuals will have difficulty in firmly gripping and pulling stubborn well-rooted weeds, for example buttercup weed. Many weeds like buttercup are also very prone to root stem breakage when pulled and when broken or crushed become slimy and even more difficult to grip. Of course those portions left behind grow again exacerbating the problem.

As a consequence of all the aforementioned problems, there remains a real need to provide improved methods and apparatus for hand weeding gardens, which grip and remove entire weeds efficiently without crushing, severing, or breaking roots, and without clogging.

SUMMARY OF THE INVENTION

The present invention is directed at improved methods and apparatus for hand weeding gardens and mainly resides in the formation of the gripping jaw. One aspect of the claimed invention provides a plier like hand tool having a jaw with a distributed force gripping zone. This gripping zone acts to distribute, rather than concentrate, gripping forces in order to effectively grip and remove weeds and other plants, including their roots, from the soil without crushing, severing, or breaking roots, and without clogging the apparatus. Another aspect of the claimed invention provides a tool as above with the gripping zone having an opening that allows the soil and weed debris to exit the tool upon repetitive use.

Among the many possibilities contemplated, a preferred embodiment uses opposing jaws pivotally coupled and biased to a normally open position and takes advantage of a distributed force gripping zone. The jaws have teeth and gripping surfaces, not necessarily perpendicular to the plane of jaw rotation, such that when the jaws are closed a space remains between the gripping surfaces to prevent crushing the plant material. The space can be tapered narrower towards the tip of the jaw. A portion of up to 95% in area of the distributed force gripping zone can comprise a space between jaw walls and/or an opening through which soil and plant debris can exit upon repetitive use making the tool more effective and self cleaning.

A preferred embodiment is compact and fully operable with only one hand but a larger embodiment made for two handed use in firm soil or on larger stubborn weeds, can have an elongated or extendible handle or be adapted to accept a longer handle. A handle can be comprised of more than one material and generally has a profile that prevents a users hand from slipping on the handle when applying force to it.

An embodiment can use handles inline with the jaw axis but in a preferred embodiment handles are at an angle to the jaw axis. Another contemplated embodiment employs a force multiplying system to increase the force being applied to the jaws and in yet another embodiment a portion of the jaws are sharpened for use as a shear type cutter for additional functionality.

Various objects, features, aspects, and advantages of the present invention will become more apparent from the following detailed description of preferred embodiments of the claimed invention, along with the accompanying drawings in which like numerals represent like components.

BRIEF DESCRIPTION OF DRAWINGS

A more complete understanding of the claimed invention can be gained by viewing the accompanying drawings and descriptions of preferred embodiments in which:

FIG. 6 is a front view of the embodiment in FIG. 1.

FIG. 7 is a top plan view of the jaw section of the embodiment in FIG. 1.

FIG. 8 is a cross sectional view of the jaws in an open state according to the embodiment in FIG. 1.

FIG. 9 is similar to FIG. 8 only depicting the jaws in a closed state

DESCRIPTION OF EMBODIMENTS

Detailed Description of the Drawing

Figure 1:
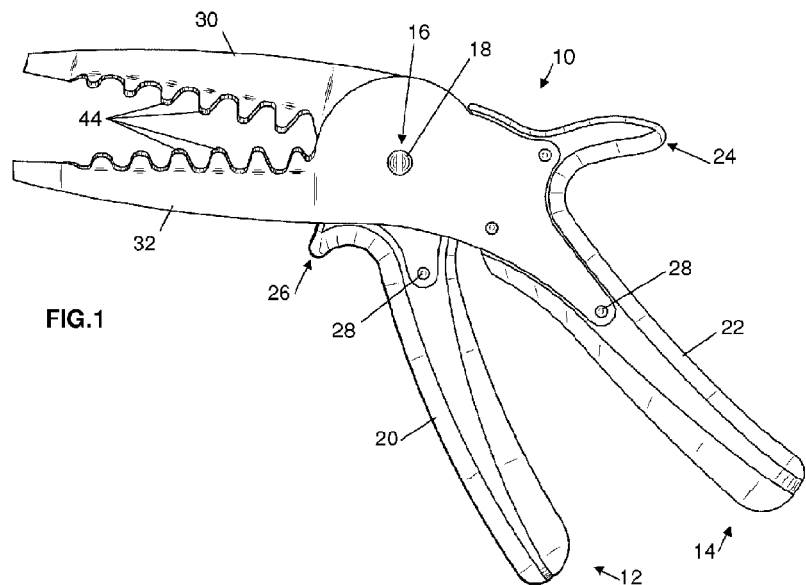
FIG. 1 is a side elevation view of a preferred embodiment of the claimed invention in an open biased state.

A preferred embodiment of the garden tool will now be explained with reference to FIG. 1 through FIG. 9 and an alternate embodiment with reference to FIG. 10. Turning now to FIG. 1, there is depicted one embodiment of the claimed invention generally referenced by numeral 10 portraying a basic concept of the inventive matter. The garden tool 10 comprising a first member 12 and a second member 14 pivotally coupled at a pivot point 16 by a pivot pin 18. A portion of first member 12 defines a first handle 20, while a portion of second member 14 defines a second handle 22. Another portion of member 12 defines a first jaw 30, while another portion of member 14 defines a second jaw 32.

In a preferred embodiment the jaws 30 and 32 are fastened to the handles 20 and 22 with rivets 28. The jaws can also be fastened to the handles by screws, or glue, or any other suitable mechanical or non-mechanical means. The jaws can also be insert molded or cast into the handles or made as an integral part of the handles, for example an entire member can be formed from one piece of sheet metal or formed in a single piece molding or casting. The jaws are preferably made from stainless steel sheet metal but can be made from any suitable material including those that are castable or moldable and those that are not.

The pivot pin 18 in a preferred embodiment comprises a threaded metal bolt and nut 66. Other pivot pins, methods, and materials, suitable for the application are also contemplated including screw and washer fastening methods, rivets, dowels, shafts, or pins of suitable material. For example, the pivot on an alternate injection molded embodiment (not shown) is contemplated as being an integral shaft protrusion acting as the pivot pin on one member and a mated integral bearing on the other member with a screw and washer securing the two members in a rotational coupling.

Figure 2:
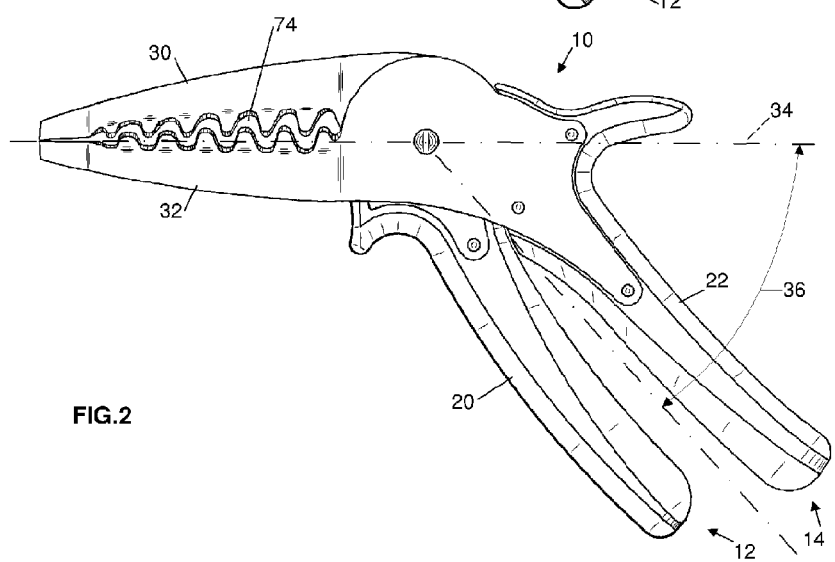
FIG. 2 is a side elevation view of the embodiment in FIG. 1 in a closed state.
Figure 3:
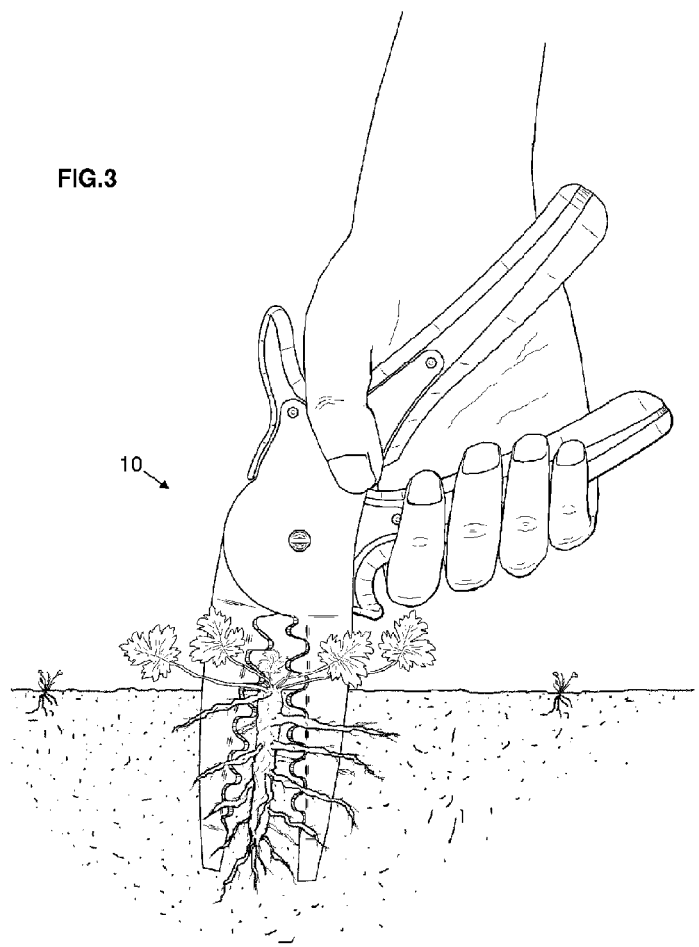
FIG. 3 is a side elevation view depicting the embodiment in FIG. 1 in use.
Figure 5:
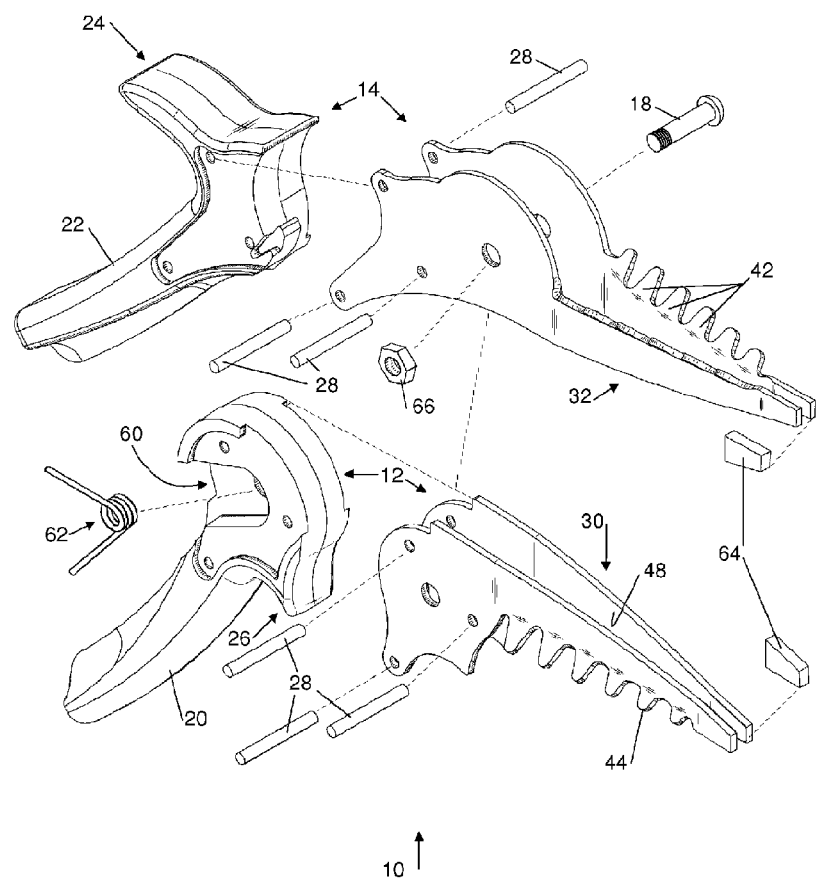
FIG. 5 is an exploded view of the embodiment in FIG. 1

In a preferred embodiment the jaws are biased to an open state as depicted in FIG. 1 by a torsion spring 62 that fits in a cavity 60 in handle 20 as shown in FIG. 5. Other suitable biasing means, mechanical and non-mechanical, are contemplated, including but not limited to, all manner of springs, magnets, pneumatics, and manual force. When the handles are brought together they close the jaws along a jaw axis 34 as shown in FIG. 2 to engage the weed or plant for removal as shown in FIG. 3.

A preferred embodiment is made to be fully operable with only one hand without the need to dig around and expose weed roots for gripping. The jaws are generally profiled to easily penetrate garden soil around a subject plant. A preferred embodiment incorporates ergonomic design including for example, texture for grip, appropriate handle shape and curvature to provide comfortable handgrip, wrist angle, and fatigue reduction. A preferred embodiment is lightweight at less than 1 kilogram, preferably less than 500 grams and more preferably less than 250 grams. The handles 20 and 22 in a preferred embodiment are made of injection molded resin. The handles can also be made of wood, metal, or any suitable hard or soft material including materials that are castable or moldable, and those that are not. Handles can also be made of multiple materials, some which might include for example soft plastic, foam, or rubber coatings. The additional materials can give more textured surfaces to enhance grip or further enhance comfort, for example with softness, warmth or cushion.

Both handles 20 and 22 in a preferred embodiment extend from their associated jaw on the same side of the jaw axis 34 at a handle angle 36. The specific handle angle is to be understood as non-limiting and as contemplated and shown in the embodiment of FIG. 10 can even be parallel to the jaw axis. The specific handle angle is a design choice dependent on the shape and profile of the handles and jaws of the embodiment. For example, while an embodiment can have up to a 90 degree handle angle, in my preferred embodiment I have found that an angle 36 of approximately 50 degrees is most comfortable and allows the most versatility of use. However an embodiment with elongated handles designed for use while sitting functions better with a lessor angle of approximately 25 degrees while straight embodiment or one designed for a standing user can be effective with no angle at all. It should also be noted that a handle might also be defined as a lever in certain embodiments.

The FIG. 1 embodiment shows a projection 24, on handle 22, which gives a profile providing a brace for the operators' hand, between a thumb and forefinger, preventing the hand from sliding towards the pivot point 16 when force is applied to the tool while inserting it into a soil medium. A similar projection 26 is shown for the operator's fingers on handle 20. It is contemplated that multiple smaller ergonomic projections can also be used, for example including one for each finger. A protrusion can be added to prevent the hand from slipping in the other direction as well. It is contemplated that one or both handles can be elongated or telescopically extendible. A longer handle allows for a two-handed grip, may facilitate stand up use, and can be useful for increased pressure application against a harder soil medium or bigger weed. It is further contemplated that the jaws or handles can be adapted to accept connectable handles of different lengths. For example a handle or a jaw could be adapted, as shown (not to scale) in FIGS. 10 27(*a*) and 27(*h*) representing possible areas to accept a standard threaded broom handle or other suitable threaded or unthreaded handles. Thus it can be understood that a wide range of handle configurations are made possible.

FIG. 7 is a top plan view of the jaw portion of a preferred embodiment showing jaws 30 and 32 having a distributed force gripping zone 40 comprising, physical gripping surfaces 42, teeth 44, and a perimeter 46 around a jaw wall 48 defining an opening 50. The opening 50, defining a non-physical gripping area, leads to an open passageway 52 between the jaw walls as depicted in FIG. 8.

The opening 50 and open passageway 52 improve the distributed force gripping zone by relieving crushing forces on a large area and enabling a flow through design of a jaw allowing repeated use with minimal build up of debris. It seems counter intuitive that a non-existent or non-physical gripping surface area, defined by the opening and passageway between the jaw walls and comprising up to 95% of the gripping zone, would still function without a significant physical surface to work with. Surprisingly though, I have found that providing an opening by removing a portion of the gripping surface, including up to the entire gripping surface that would otherwise form the base of a channel formed by the jaw walls does not affect the function of the gripping zone. Instead, the open passageway formed considerably improves the effectiveness of the tool and the gripping zone by reducing the handle force needed to grip a weed and more importantly by further reducing and distributing the forces applied to the weed without crushing it. The weed crown, main root and surrounding soil are held within the confines of the gripping zone, including the open passageway, while the branching rootlets are held within the space between the teeth. No crushing, pinching, or severing of the weed occurs and entire weed is easily removed from the soil. Only one jaw needs to have this unrestricted open passageway to be effective, however having two or more jaws with this feature is superior. A further benefit results when the jaw is able to self-clean as each new "mouth full" pushes the last mouth full of debris out through the passageway. Of course an opening does not have to comprise such a large portion of the gripping zone to still be effective at improving the distribution of forces and reducing the crushing effect of a normal gripping zone. I have experimented with different amounts from 10 percent to 95 percent of the gripping zone forming the opening and found effectiveness increases with the larger percentages.

FIG. 8 and FIG. 9 are sectional views of the jaws depicting them in open and closed states respectively. FIG. 8 and FIG. 9 show gripping surfaces 42 and teeth 44 in this embodiment are formed at an angle 70 other than perpendicular to a plane 72 of jaw rotation or in this case the jaw wall 48. The plane 72 of jaw rotation being the plane the jaws move in when opening and closing. The jaw walls can also be angled to plane 72 either positively or negatively but in the preferred embodiment they are parallel. The angle 70 of the gripping surfaces increases the surface area available for the distribution of gripping forces while reducing crush points.

When the jaws are in a closed state, there is a space 74 remaining between the gripping surfaces and between the teeth as depicted clearly in FIG. 2. I have found it beneficial that the space increase in size towards the pivot point to reduce the chance of severing larger roots as they are generally gripped further into the jaw. Smaller roots, generally gripped nearer the tip of the jaw, do not need as much space to avoid being crushed or severed.

Figure 4:
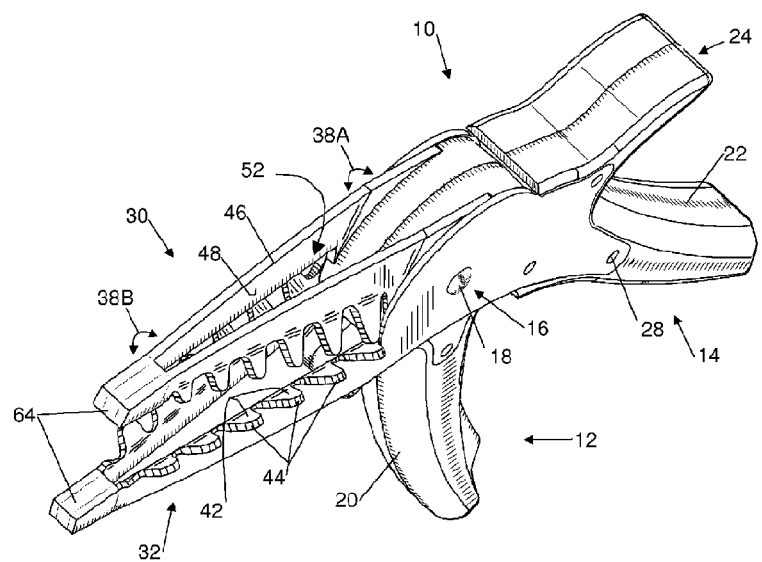
FIG. 4 is an isometric view of the embodiment in FIG. 1.

FIG. 4 and FIG. 7 show the jaws in a preferred embodiment have a bend at an angle 38A that brings each left and right jaw wall to meet at their distal ends where the angle is reversed 38B and they are fastened together with a spacer 64 between them. The spacer 64 can be spot welded or riveted in place or even eliminated. The spacing can be accomplished by other means, for example the distal end of a jaw wall can have an angled tab, either vertical or horizontal, which meets and is joined to a tab from, or directly to, the other wall to form the spacing between the distal ends. If a space is not desired, the distal ends of the jaws can simply be joined together. The entire jaw can also be formed from a piece of tubing or one piece of sheet metal bent to shape. Angle 38A enables the formation of a wedge shaped space between the jaw walls that increases in size towards the pivot point 16. The wedge shaped space allows the jaw walls to act as additional gripping surfaces as a substance is pulled by distributing gripping forces to a larger volume of substance and increasing holding power through a jamming or packing of the wedge space, rather than a crushing action. Again, this further distribution of forces is particularly useful when pulling on weeds as it avoids over pinching and severing roots, a problem that plagues other weed gripping tools. A less preferred embodiment does not have angle 38A or 38B and the space between the jaw walls forms a generally rectangular, oval, or similar shape, that is slightly less effective as it does not increase the holding power by the wedge packing action but still remains very effective.

The terms tooth and teeth are used herein to mean an element from a class of both shapes, including ridges, groves, undulations, columns, pointed, rounded, dull, sharp, faceted, smooth, jagged, large, small, and of materials, including those that are hard, and soft, protruding from the jaw or comprising a gripping surface. I have found the inclusion of at least one tooth in the gripping zone helps prevent the gripped substance from slipping from the tools' grasp. Additionally I have found a plurality of medium size teeth to be more effective than a higher number of smaller teeth, which tend to clog with debris and become ineffective. I have also found that teeth with an angle of approximately 45 degrees inward or outward relative to the plane of jaw rotation provide additional force distributing surface areas and reduce the chance of severing a root. Other angles, for example 20 degrees or 65 degrees also work although somewhat less effectively and non angled teeth are the least effective as they provide minimal distribution of forces.

Figure 10:
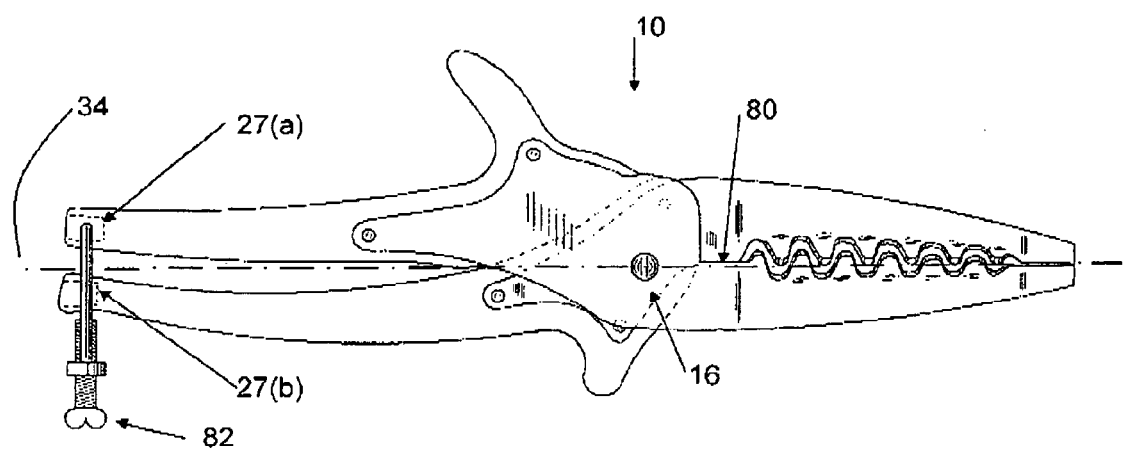
FIG. 10 is a side view of a second embodiment of the claimed invention with handles inline with the jaws and a cutter.

FIG. 10 is a side view of a second embodiment of the claimed invention wherein the handles are essentially parallel with the jaw axis 34 and wherein a portion of the jaws near the pivot are adapted to work together as a shear type cutter 80 for additional functionality. An adjustable locking bail is depicted in FIG. 10. There are many other kinds of commonly known simple locking mechanisms that can also be employed to lock the jaws in a closed position when not in use. The bail 82 in FIG. 10 has a threaded nut and bolt making it adjustable so that it can also function as a force multiplier to increase the pressure applied to the jaws when gripping a substance. Further embodiments are contemplated having other force multiplying components to increase the gripping force exerted by the jaws. Force multiplication can be achieved in many ways including for example, additional members and pivot points, cam and follower systems, or divergent slot and pin systems.

Having explained at least one embodiment of the present invention in detail, it is to be understood that the claimed invention is not limited in its application to the details of construction or to the arrangements of the components set forth in the description or illustrative drawings herein as such may of course vary. Those skilled in the art will appreciate the multiple possible configurations that would be considered to fall within the scope of intent of the claimed invention. For example the claimed present invention can comprise a multitude of other tooth and or jaw geometry's, profiles, and or configurations. The relative angle between the jaws and handles can be any degree and the handles can be attached to elongated handle sections possibly including lever mechanisms for stand up use and or can employ various known force multiplying methods to the handles or jaws. In addition the handles depicted can be formed in or have added to them any of the many possible ergonomic shapes and or materials for functionality and comfort. The present description is a simplistic form of the claimed invention and has used a construction of sheet metal attached to a molded handle for illustrative example.

The claimed invention can be manufactured in many other forms and with materials including but not limited to sheet or cast materials, coated materials, laminated or machined materials, injection molded materials including reinforced polymers, natural materials including wood, or combinations thereof. Other fabrication methods including die-casting, laminating, machining, injection molding, and stamping can be used to manufacture a device incorporating the claimed invention. Any such forms, embodiments, or materials and methods of manufacture would be considered to fall within the scope and intent of the claims of the present invention.

It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

Thus, specific compositions and methods of a gardening tool have been disclosed. It should be apparent, however, to those skilled in the art that many more modifications besides those already described are possible without departing from the inventive concepts herein. The inventive subject matter, therefore, is not to be restricted except in the spirit of the disclosure Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As indicated previously, while specific embodiments of the claimed invention have been described in detail, those skilled in the art will appreciate that various modifications and alternatives to those embodiments can be developed in light of the details and teachings thereof in this disclosure. Accordingly the particular descriptions, drawings and arrangements of the disclosure are meant to be illustrative only and not limiting as to the scope of the claimed invention which is to be given the full breadth of the claims below and any and all equivalents thereof.

The invention claimed is:

1. A garden tool comprising:
   a plurality of members;
   a first member comprising a first lever, a pivot point, and a first jaw having a distal end and a proximal end;
   a second member comprising a second lever and a second jaw respectively;
   the first jaw comprising; a left side and a right side joined at the distal end, a gripping zone comprising a distributed force gripping zone, a gripping surface having a continuous outer perimeter that defines the gripping zone and, a first inner perimeter that defines a first opening in the gripping zone wherein the first opening is proximally-distally longer than it is wide and has a minimal area that is between 20% and 90% of a maximal area of the gripping zone and through which debris can internally exit the gripping zone and the jaw itself; and
   wherein the first and second levers operate the first and second jaw respectively, the first jaw rotates at the pivot point about a first pivot between an open and a closed position relative to the second jaw and the opening and closing defines a plane of motion, the first pivot has a pivot axis, the first jaw has a jaw axis that is perpendicular to and between the pivot axis and the distal end of the first jaw when at the closed position, the first and second jaw are substantially on opposite sides of a shared plane of the jaw axis and the pivot axis when at the closed position, the continuous outer perimeter starts and ends at the pivot plane perpendicular to the shared plane, the inner perimeter is on a plane substantially parallel to the shared plane, and the first member when divided into 20 equally spaced lateral cross sectional slices perpendicular to the shared plane from the distal end to the pivot point has a majority of cross sections that show left and right sides that are not connected laterally in the cross sectional slice.

2. The garden tool of claim 1 wherein the first and second opposed jaws have a distance separating their respective gripping surfaces proximally from where the jaws touch at the distal end when in the closed position, and the distance is progressively larger proximally than distally.

3. The garden tool of claim 1 wherein at least one of the jaws has a row of teeth.

4. The garden tool of claim 1 wherein at least one of the jaws has at least one tooth.

5. The garden tool of claim 1 including biasing means for biasing the jaws apart.

6. The garden tool of claim 5 wherein the biasing means is a spring.

7. The garden tool of claim 1 wherein at least one member is configured to prevent a users hand from slipping.

8. The garden tool of claim 1 wherein at least one member is characterized by more than one material.

9. The garden tool of claim 1 wherein at least one member is configured to be elongated and extendible.

10. The garden tool of claim 1 wherein at least one of the members is adapted to accept an extension whereby the extension extends the reach of the user.

11. The garden tool of claim 1 wherein, at the closed position, more than one of the levers are on the same side of the shared plane and at least one of the levers is at an angle of between 40 and 60 degrees relative to the shared plane.

12. The garden tool of claim 1 wherein the minimal area of the first opening is between 30% and 90% of a maximal area of the gripping zone.

13. The garden tool of claim 1 wherein at least some of the gripping surfaces are formed at an outward angle from the plane of motion such that debris is deflected toward the plane of motion during closing motion.

14. The garden tool of claim 1 wherein, at the closed position, more than one of the levers are on the same side of the shared plane and at least one of the levers is at an angle of between 20 and 70 degrees relative to the shared plane.

15. The garden tool of claim 1 is configured to have a weight of less than 500 grams and to be fully operable with only one hand.

16. The garden tool of claim 1 wherein the first opening is the largest opening in the first jaw.

17. The garden tool of claim 1 wherein the first jaw is further comprising; a pair of laterally spaced longitudinal jaw walls progressively shorter distally than proximally and joined at the distal end, essentially no base between the walls, an open ended passageway perpendicular to the shared plane and between the jaw walls, a first end of the open ended passageway that defines the inner perimeter and the first opening in the gripping zone facing the shared plane and, a second end of the open ended passageway essentially parallel to and facing away from the shared plane.

18. The garden tool of claim 17 wherein the lateral distance between the jaw walls progressively increases from the distal end towards the pivot.

19. The garden tool of claim 17 wherein the jaw walls are not perpendicular to the shared plane.

20. The garden tool of claim 1 wherein the minimal area of the first opening is between 40% and 90% of a maximal area of the gripping zone area.

21. The garden tool of claim 1 wherein the minimal area of the first opening is between 50% and 90% of a maximal area of the gripping zone.

22. A garden tool as claimed in claim 1 wherein more than one of the levers are on the same side of the shared plane when at the closed position.

* * * * *